United States Patent
Seraj et al.

(10) Patent No.: US 11,303,049 B2
(45) Date of Patent: Apr. 12, 2022

(54) CABLE NEUTRAL WIRES CONNECTORS AND METHODS AND CONNECTIONS INCLUDING SAME

(71) Applicant: TE Connectivity Services GmbH, Schaffhausen (CH)

(72) Inventors: Mahmoud K. Seraj, Apex, NC (US); Harry George Yaworski, Holly Springs, NC (US); Brian Ayres, Raleigh, NC (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 0 days.

(21) Appl. No.: 16/924,944

(22) Filed: Jul. 9, 2020

(65) Prior Publication Data

US 2022/0013933 A1      Jan. 13, 2022

(51) Int. Cl.
| | | |
|---|---|---|
| H01R 9/05 | (2006.01) | |
| H01R 4/36 | (2006.01) | |
| H02G 15/18 | (2006.01) | |
| H01R 4/70 | (2006.01) | |
| H01R 13/621 | (2006.01) | |

(52) U.S. Cl.
CPC ............ *H01R 9/0512* (2013.01); *H01R 4/36* (2013.01); *H01R 4/70* (2013.01); *H01R 9/0503* (2013.01); *H01R 13/6215* (2013.01); *H02G 15/1833* (2013.01)

(58) Field of Classification Search
CPC ...... H01R 9/05; H01R 9/0512; H01R 9/0503; H01R 4/20
See application file for complete search history.

(56) References Cited

U.S. PATENT DOCUMENTS

| | | | |
|---|---|---|---|
| 3,163,707 A | 12/1964 | Darling | |
| 3,475,719 A | 10/1969 | Akin et al. | |
| 3,689,114 A | 9/1972 | Meserole | |
| 3,921,257 A * | 11/1975 | Appleby | H01R 4/14 24/122.6 |
| 4,028,487 A * | 6/1977 | McLean | H01R 4/64 174/78 |

(Continued)

FOREIGN PATENT DOCUMENTS

WO     2009137013 A1    11/2009

OTHER PUBLICATIONS

"CSJA Cold Shrinkable 'All-In-One' Straight Joint for Polymeric Insulated Cables Up to 42 kV" Tyco Electronics EPP 1348 (4 pages) (Jul. 2007).

(Continued)

*Primary Examiner* — Chau N Nguyen

(57) ABSTRACT

A cable neutral wires connector for connecting neutral wires of a cable, the cable having a cable longitudinal axis, includes a connector body, a plurality of neutral wire ports, and at least one securing mechanism. The neutral wire ports are defined in the connector body. The neutral wire ports are each configured to receive at least one of the neutral wires therethrough. The at least one securing mechanism is configured to secure the neutral wires in the connector body. The connector body is configured to be mounted on the cable such that the neutral wire ports are circumferentially distributed about the cable longitudinal axis.

24 Claims, 8 Drawing Sheets

(56) References Cited

U.S. PATENT DOCUMENTS

| | | | | |
|---|---|---|---|---|
| 4,080,024 A | * | 3/1978 | Kroon | H01R 4/646 174/78 |
| 4,195,197 A | * | 3/1980 | Kurr | H01B 9/028 164/108 |
| 4,586,774 A | * | 5/1986 | Didier | H02G 15/10 439/274 |
| 4,601,529 A | | 7/1986 | Billet | |
| 4,791,237 A | * | 12/1988 | Sherman | H01R 4/646 174/40 R |
| 4,968,857 A | | 11/1990 | McGrane | |
| 5,233,363 A | | 8/1993 | Yarsunas et al. | |
| 5,286,220 A | | 2/1994 | Watson | |
| 5,315,063 A | | 5/1994 | Auclair | |
| 5,577,926 A | | 11/1996 | Cox | |
| 5,740,583 A | | 4/1998 | Shimada et al. | |
| 5,807,447 A | * | 9/1998 | Forrest | H01B 9/028 156/244.12 |
| 5,844,170 A | | 12/1998 | Chor et al. | |
| 6,364,677 B1 | | 4/2002 | Nysveen et al. | |
| 7,182,617 B1 | | 2/2007 | Cairns et al. | |
| 7,264,494 B2 | * | 9/2007 | Kennedy | H01R 13/405 439/274 |
| 7,476,114 B1 | | 1/2009 | Contreras | |
| 7,728,227 B2 | | 6/2010 | Portas et al. | |
| 7,858,883 B2 | | 12/2010 | Seraj et al. | |
| 7,963,811 B2 | * | 6/2011 | Wason | H01R 4/64 439/798 |
| 8,030,570 B2 | | 10/2011 | Seraj et al. | |
| 8,205,911 B2 | | 6/2012 | Cordes et al. | |
| 8,550,842 B1 | | 10/2013 | Gutierrez et al. | |
| 8,777,643 B2 | * | 7/2014 | De France | H01R 9/0524 439/99 |
| 8,809,680 B2 | * | 8/2014 | Kiely | H01R 4/34 174/51 |
| 8,875,368 B2 | | 11/2014 | O'Sullivan | |
| 9,184,576 B2 | | 11/2015 | Vallauri et al. | |
| 9,202,612 B2 | | 12/2015 | Hernandez et al. | |
| 9,224,519 B2 | | 12/2015 | Mclaughlin et al. | |
| 9,224,522 B2 | | 12/2015 | Yaworski et al. | |
| 9,960,576 B2 | | 5/2018 | Chuang | |
| 10,283,878 B2 | | 5/2019 | Newman | |
| 10,594,075 B2 | * | 3/2020 | Yaroslavskiy | H01R 4/30 |
| 2002/0176674 A1 | * | 11/2002 | Auclair | G02B 6/46 385/101 |
| 2005/0269124 A1 | | 12/2005 | Suzuki et al. | |
| 2007/0293087 A1 | | 12/2007 | Kennedy et al. | |
| 2008/0143097 A1 | | 6/2008 | Canale | |
| 2009/0181583 A1 | | 7/2009 | Krabs | |
| 2010/0012350 A1 | | 1/2010 | Hardi et al. | |
| 2010/0193235 A1 | | 8/2010 | Taylor et al. | |
| 2010/0276196 A1 | | 11/2010 | Seraj et al. | |
| 2010/0279542 A1 | | 11/2010 | Seraj et al. | |
| 2011/0011484 A1 | | 1/2011 | Evoniuk et al. | |
| 2013/0183464 A1 | | 7/2013 | Gassaway et al. | |
| 2014/0273579 A1 | | 9/2014 | Madden | |
| 2014/0370741 A1 | | 12/2014 | Bolcato et al. | |
| 2016/0005511 A1 | | 1/2016 | Gravermann et al. | |
| 2017/0250008 A1 | | 8/2017 | Somasiri et al. | |
| 2017/0310093 A1 | | 10/2017 | Chuang | |
| 2017/0317481 A1 | | 11/2017 | O'Sullivan | |
| 2018/0145495 A1 | | 5/2018 | Iyer et al. | |
| 2020/0295478 A1 | * | 9/2020 | Beck | H01R 9/05 |

OTHER PUBLICATIONS

"CSJA In-line Cold Shrinkable Joints for 1/C Shielded Power Cables (15-35kV)" Tyco Electronics (2 pages) (2006/2007).

Pfisterer "Cable Screen/Sheath Connection, Examples for Testing and Qualification" Presentation from ICC Spring Meeting Apr. 7-10, 2019 (18 pages).

* cited by examiner

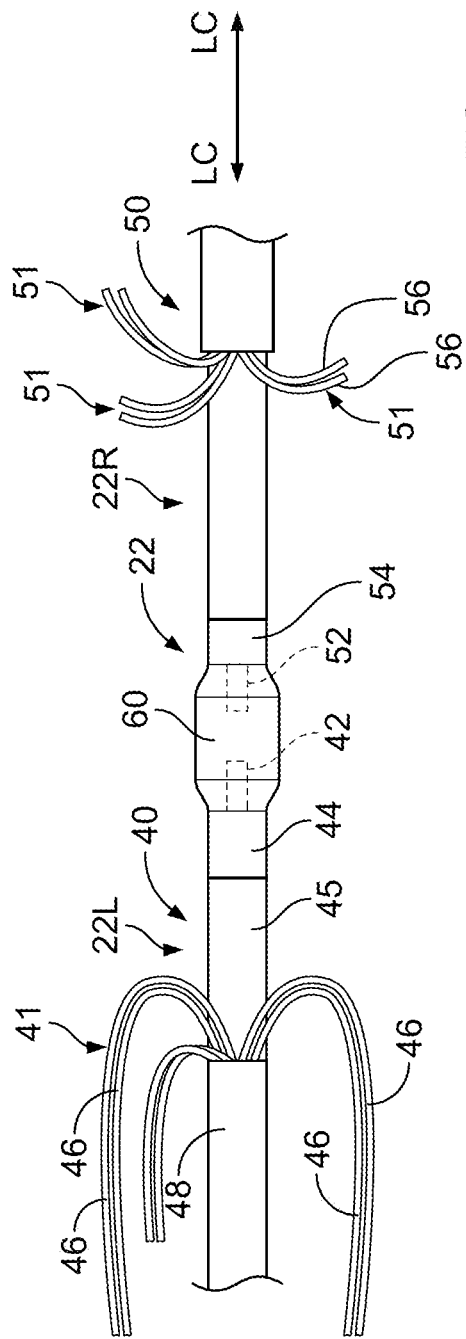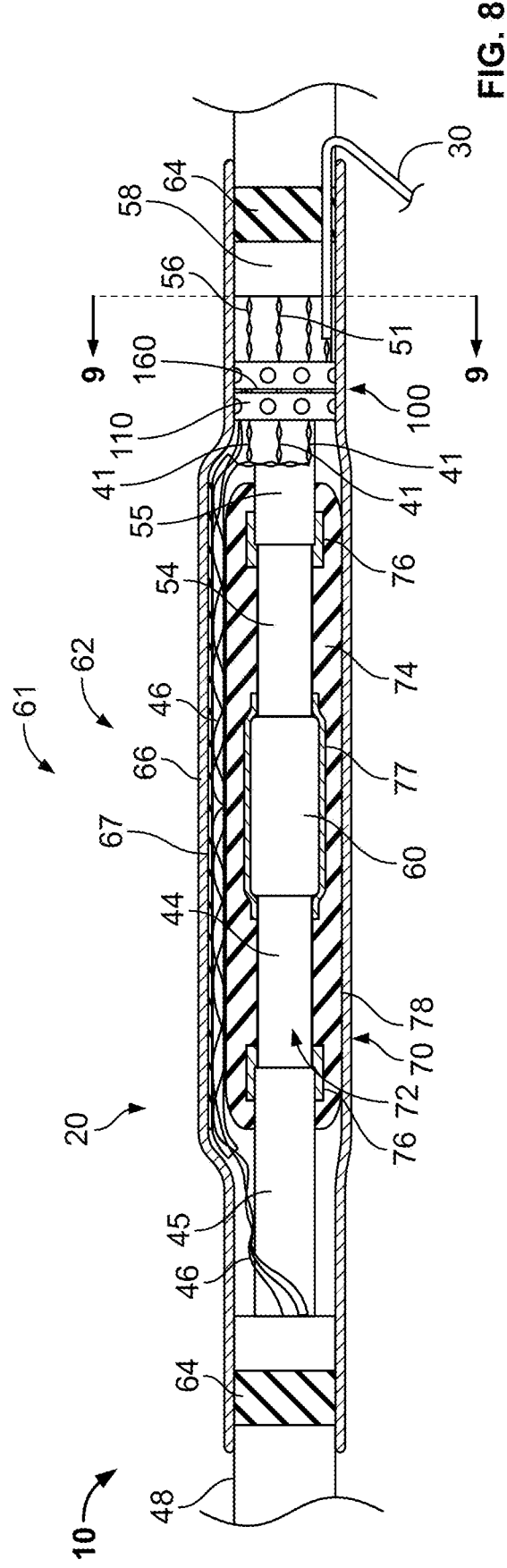

CABLE NEUTRAL WIRES CONNECTORS AND METHODS AND CONNECTIONS INCLUDING SAME

FIELD OF THE INVENTION

The present invention relates to electrical connectors and, more particularly, to electrical connectors for cable neutral wires and methods for using the same.

BACKGROUND OF THE INVENTION

Concentric neutral cables are commonly used as electrical power transmission cables. A concentric neutral cable typically includes at least one primary conductor surrounded by a polymeric insulation layer, a conductive layer, one or more neutral wires surrounding the conductive layer, and a polymeric jacket surrounding the neutral wires. When concentric neutral cables are spliced, it is often necessary or desirable to electrically connect the neutral wires of the cables on either side of the splice to one another. It is known to electrically couple the neutral wires of the spliced cables using a neutral connector.

SUMMARY OF THE INVENTION

According to some embodiments, a cable neutral wires connector for connecting neutral wires of a cable, the cable having a cable longitudinal axis, includes a connector body, a plurality of neutral wire ports, and at least one securing mechanism. The neutral wire ports are defined in the connector body. The neutral wire ports are each configured to receive at least one of the neutral wires therethrough. The at least one securing mechanism is configured to secure the neutral wires in the connector body. The connector body is configured to be mounted on the cable such that the neutral wire ports are circumferentially distributed about the cable longitudinal axis.

According to some embodiments, a method for forming a connection with a cable, the cable having neutral wires and a cable longitudinal axis, includes providing a cable neutral wires connector including: a connector body; a plurality of neutral wire ports defined in the connector body; and at least one securing mechanism. The method further includes: inserting the neutral wires through a plurality of the neutral wire ports; securing the inserted neutral wires in the connector body using the at least one securing mechanism; and mounting the connector body on the cable. The neutral wire ports are circumferentially distributed about the cable longitudinal axis when the connector body is mounted on the cable.

According to some embodiments, a cable connection assembly includes a cable and a cable neutral wires connector. The cable has neutral wires and a cable longitudinal axis. The cable neutral wires connector includes a connector body, a plurality of neutral wire ports, and at least one securing mechanism. The connector body is mounted on the cable. The neutral wire ports are defined in the connector body. The neutral wires are inserted through a plurality of the neutral wire ports. The inserted neutral wires are secured in the connector body using the at least one securing mechanism. The neutral wire ports are circumferentially distributed about the cable longitudinal axis.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 7 and 8 are fragmentary, side views illustrating methods according to some embodiments for installing the connector of FIG. 1 and a protected connection system on a splice connection between two concentric neutral cables.

DETAILED DESCRIPTION OF THE DRAWINGS

Figure 1:
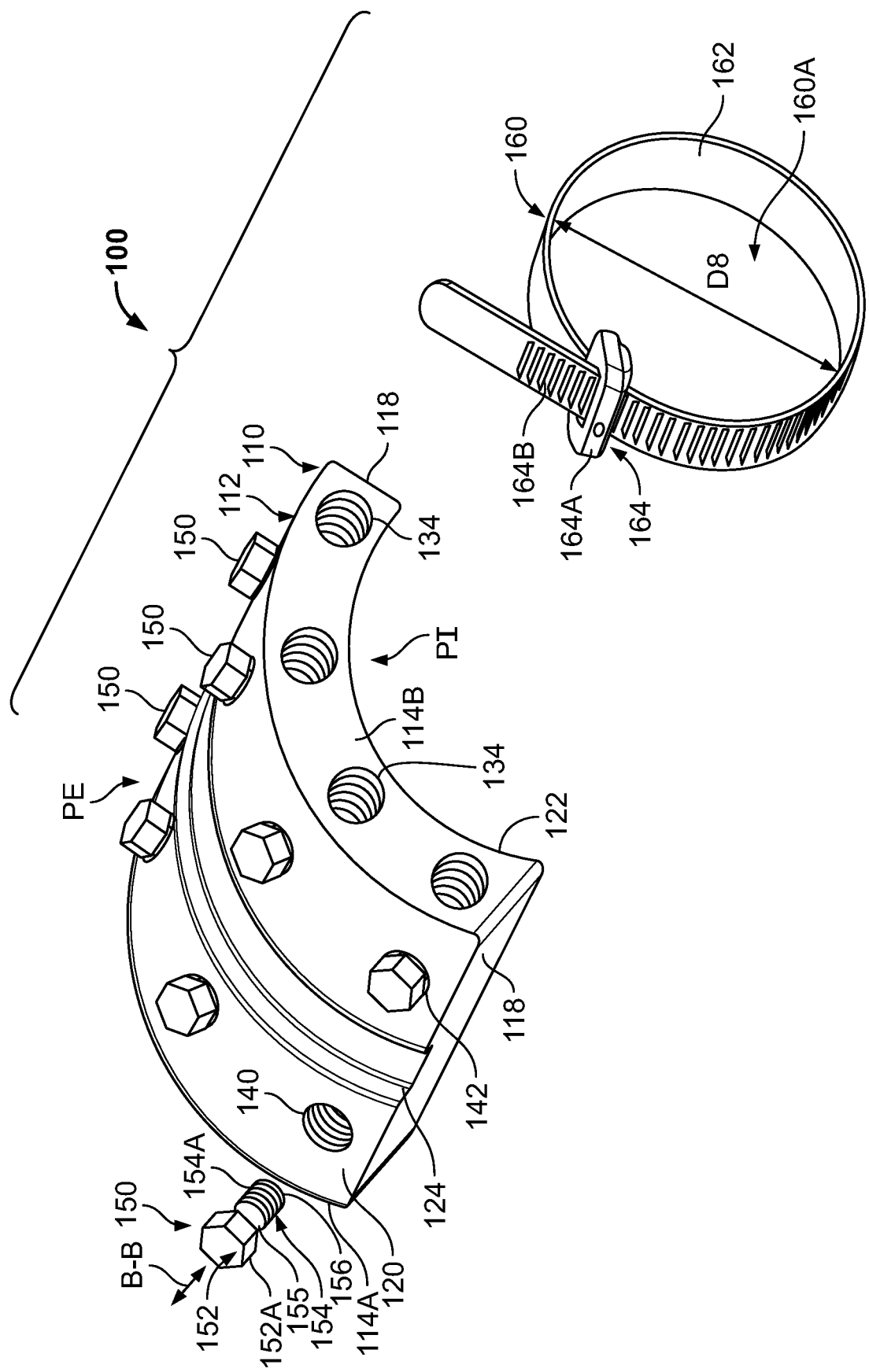
FIG. 1 is an exploded, perspective view of a cable neutral wires connector according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

Figure 9:
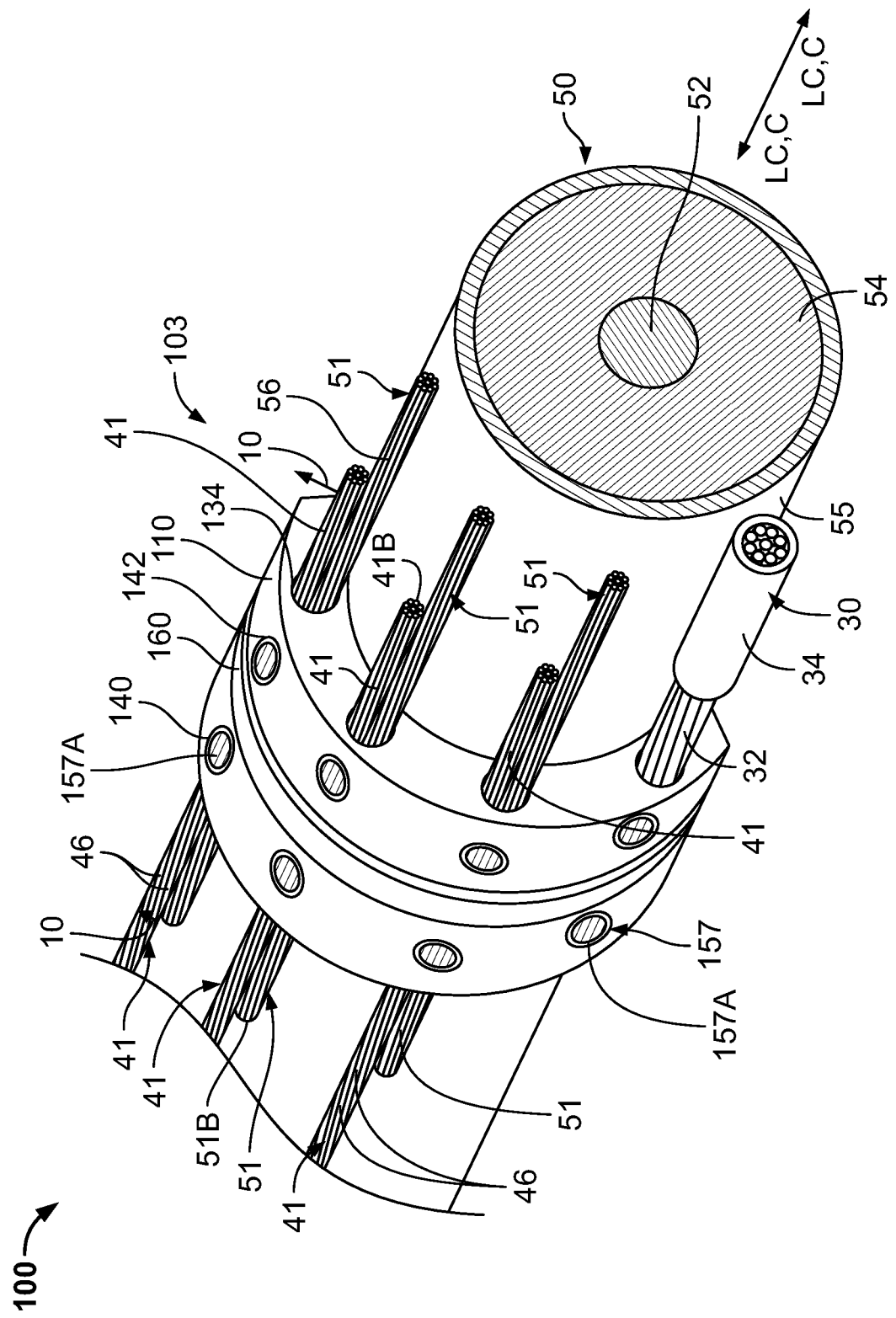
FIG. 9 is a fragmentary, cross-sectional, perspective view of the protected connection system of FIG. 8 taken along the line 9-9 of FIG. 8.
Figure 10:
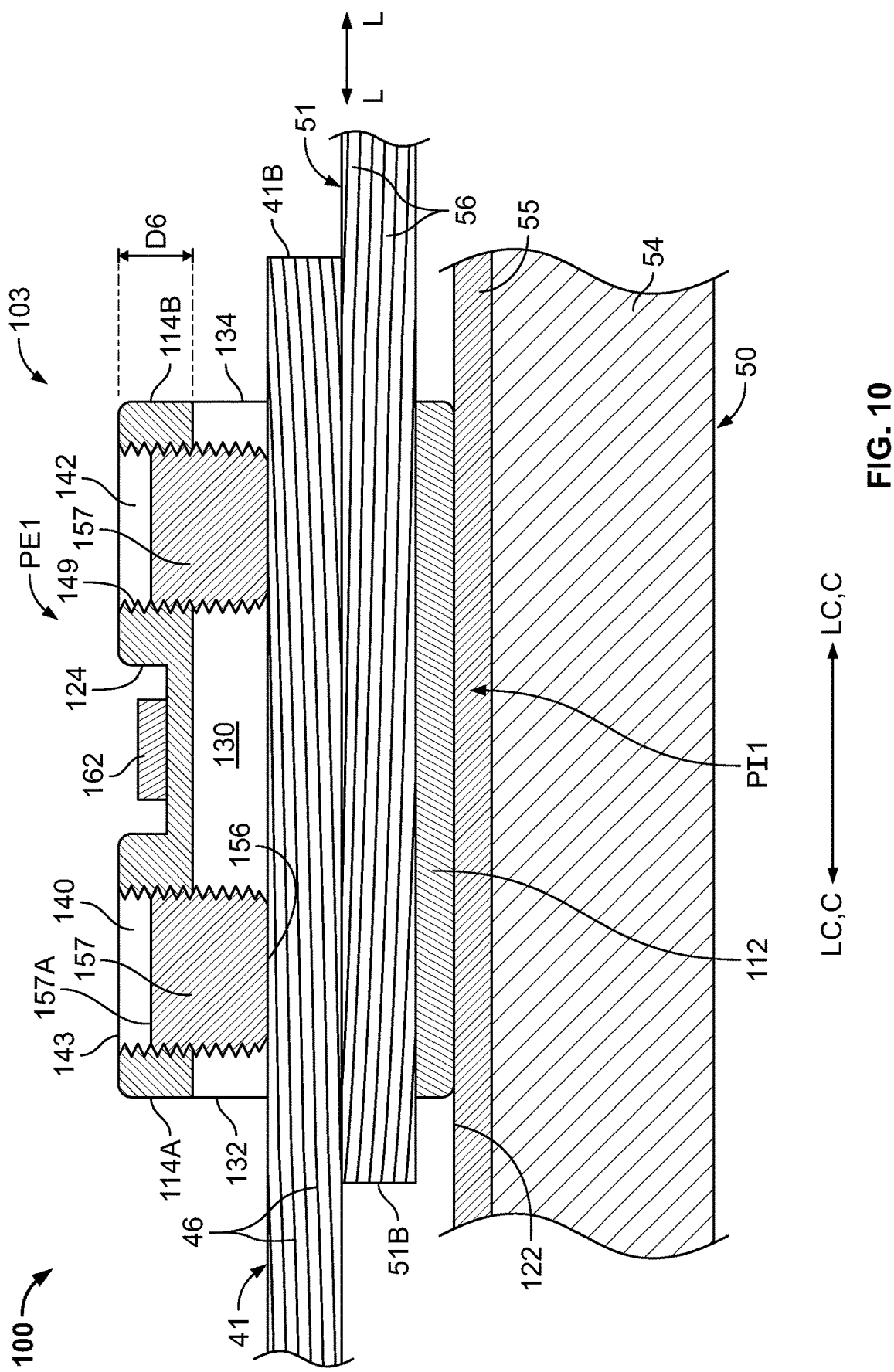
FIG. 10 is a cross-sectional view of the protected connection system of FIG. 8 taken along the line 10-10 of FIG. 8.

With reference to the figures, a cable neutral wires connector 100 according to some embodiments of the present invention is shown therein. The connector 100 may be used to form a cable neutral wires connection assembly 103 (FIGS. 9 and 10). The connector 100 can be used in combination with a splice connector 60 and a cover system 62 to form a protected connection system 61 (FIG. 8). According to some embodiments and as shown, the cable neutral wires connector 100 is a shear bolt connector.

In some embodiments, the connector 100 is provided as a pre-packaged kit of components for subsequent assembly by an installer (e.g., a field installer) using a method as described herein. In some embodiments, the protected connection system 61 is provided as a pre-packaged kit of components for subsequent assembly by an installer (e.g., a field installer) using a method as described herein.

The connector 100 and the protected connection system 61 may be used to form a protected splice or connection assembly 20 (FIG. 8) between a pair of electrical power transmission cables 40 and 50 joined at a splice connection 22 (FIG. 7).

The connector 100 may be further used to form a connection with a supplemental or ground cable 30 (FIGS. 8 and 9).

Figure 6:
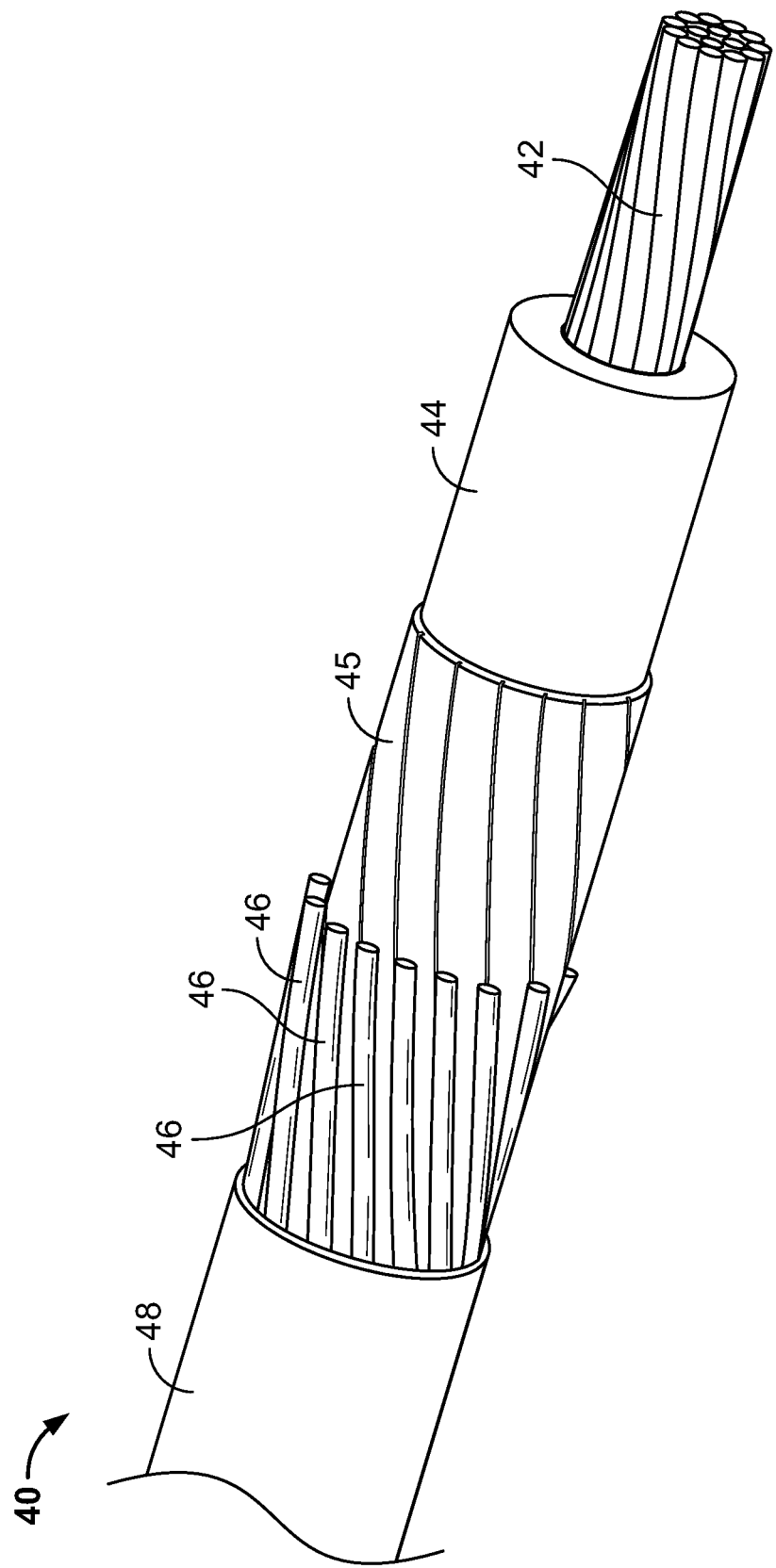
FIG. 6 is a perspective view of an exemplary concentric neutral cable for use with the connector of FIG. 1.

As shown in FIG. 6, the cable 40 includes a primary electrical conductor 42, a polymeric insulation layer 44, a semiconductive layer 45, a plurality of neutral conductors 46, and a jacket 48, with each component being concentrically surrounded by the next. According to some embodiments and as shown, the neutral electrical conductors 46 are individual wires, which may be helically wound about the semiconductive layer 45.

The primary conductor 42 may be formed of any suitable electrically conductive materials such as copper (solid or stranded).

The polymeric insulation layer 44 may be formed of any suitable electrically insulative material, such as crosslinked polyethylene (XLPE) or EPR.

The semiconductive layer 45 may be formed of any suitable semiconductor material, such as carbon black with silicone.

The neutral wires 46 may be formed of any suitable material, such as copper.

The jacket 48 may be formed of any suitable material, such as EPDM.

The cable 50 is similarly constructed with a primary electrical conductor 52, a polymeric insulation layer 54, a semiconductive layer 55, a plurality of neutral wires (electrical conductors) 56, and a jacket 58 corresponding to components 42, 44, 45, 46 and 48, respectively. The exemplary cable 50 has a lengthwise or longitudinal axis LC-LC (FIGS. 7, 9 and 10).

The ground cable 30 is connected to an electrical grounding system, earthing system, or protective earth. In some embodiments, the ground cable 30 includes an electrical conductor 32 surrounded by an insulation layer 34. In some embodiments, the conductor 32 includes a bundle of conductor wires (e.g., copper wires).

The splice connector 60 may be any suitable type of connector, such as a metal crimp connector or a shear bolt barrel connector.

The cover system 62 includes a tubular inner sleeve or joint body 70 and a tubular outer sleeve or rejacket sleeve 66. In some embodiments, the cover system 62 further includes one or more neutral wire pass-through ducts 67. In some embodiments, the components 70, 66 are provided on and deployed from a holdout. The components 70, 66 may be provided pre-expanded on a single holdout, or on respective individual holdouts. In other embodiments, the cover system 62 includes only the rejacket sleeve 66.

The joint body 70 includes a passage 72 that extends axially fully through the joint body 70. The joint body 70 includes a tubular insulation layer 74, a pair of axially opposed, tubular stress cone layers 76, a Faraday cage layer 77, and a tubular outer semiconductive layer 78. In some embodiments, the Faraday cage layer 77, the stress cone layers 76, and the insulation layer 74 are bonded (e.g., adhered or molded) together to form a unitary component.

The insulation layer 74 can be formed of any suitable material. According to some embodiments, the insulation layer 74 is formed of a dielectric or electrically insulative material. According to some embodiments, the insulation layer 74 is formed of an elastically expandable material. According to some embodiments, the insulation layer 74 is formed of an elastomeric material. According to some embodiments, the insulation layer 74 is formed of liquid silicone rubber (LSR). Other suitable materials may include EPDM or ethylene propylene rubber (EPR). According to some embodiments, the insulation layer 74 has a Modulus at 100 percent elongation (M100) in the range of from about 0.4 to 0.52 MPa.

The Faraday cage layer 77 is a generally tubular sleeve bonded to the inner surface of the insulation layer 74. The Faraday cage layer 77 may be formed of a suitable elastically conductive elastomer. In use, the Faraday cage layer 77 may form a Faraday cage to provide an equal potential volume about the connector 60 so that an electric field is cancelled in the surrounding air voids.

The stress cone layers 76 are generally tubular sleeves bonded to the inner surface of the insulation layer 74 at either end thereof. The stress cone layers 76 may be formed of a suitable electrically conductive elastomer. In use, the stress cone layers 76 may serve to redistribute the voltage along the surface of the cable insulation 44, 54 to reduce or prevent the degradation of the insulation 44, 54 that might otherwise occur.

The semiconductive layer 78 may be formed of any suitable semiconductor material such as carbon black with silicone.

The rejacket sleeve 66 can be formed of any suitable material. According to some embodiments, the rejacket sleeve 66 is formed of an electrically insulative material. According to some embodiments, the rejacket sleeve 66 is formed of an elastically expandable material. According to some embodiments, the rejacket sleeve 66 is formed of an elastomeric material. According to some embodiments, the rejacket sleeve 66 is formed of ethylene propylene diene monomer (EPDM) rubber. Other suitable materials may include neoprene or other rubber.

The cable neutral wires connector 100 includes a connector member 110, securing mechanisms (including a plurality of securing bolts 150), and a connector retainer 160. According to some embodiments and as shown, the connector 100 is a shear bolt connector and the securing bolts 150 are shear bolts. The connector 100 has a lengthwise or main axis L-L and a transverse or lateral axis T-T perpendicular to the main axis L-L.

The connector member 110 includes a connector body 112 having a first (left) axial end 114A, an opposing second (right) axial end 114B, a radially outer side 116A, an opposing radially inner side 116B, and opposed lateral ends 118. The connector body 112 has a generally curved, truncated cylindrical shape.

Figure 2:
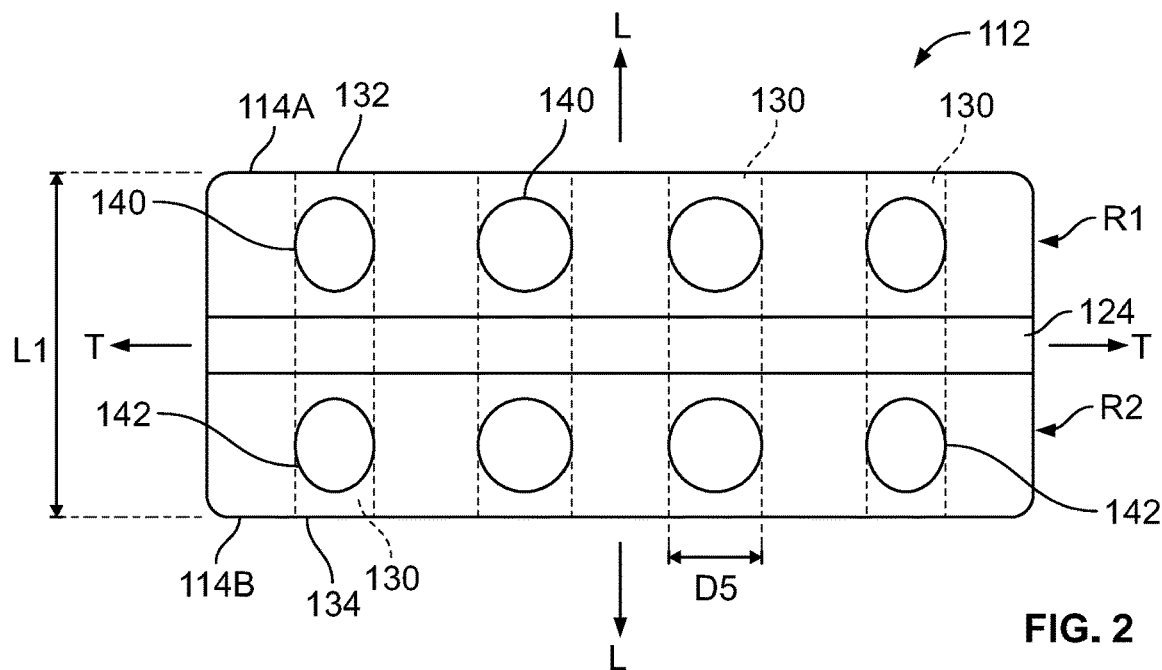
FIG. 2 is a top view of a connector body forming a part of the connector of FIG. 1.

In some embodiments, the axial length L1 (FIG. 2) of the connector body 112 from the end 114A to end 114B is in the range of from about 57 to 59 mm.

The body 112 has an outer surface 120 on its outer side 116A. The outer surface 120 has an arcuate, convex, truncated or partial cylindrical profile PE (FIG. 1). Thus, it will be appreciated that the outer surface 120 has a substantially linear profile PE1 (FIG. 10) in a cross-section parallel to the main axis L-L, and a curvilinear or arcuate profile PE2 (FIG. 4) in a cross-section orthogonal to the main axis L-L (i.e., lateral cross-section). In some embodiments, the arc measure or arc angle of the profile PE2 is in that range of from about 90 to 180 degrees.

The body 112 has an inner surface 122 on its inner side 116B. The inner surface 122 has an arcuate, concave, truncated or partial cylindrical profile PI (FIG. 1). Thus, it will be appreciated that the inner surface 122 has a substantially linear profile PI1 (FIG. 10) in a cross-section parallel to the main axis L-L, and a curvilinear or arcuate profile PI2 (FIG. 4) in a cross-section orthogonal to the main axis L-L (i.e., lateral cross-section). In some embodiments, the arc measure or arc angle of the profile PI2 is in that range of from about 90 to 180 degrees.

Figure 4:
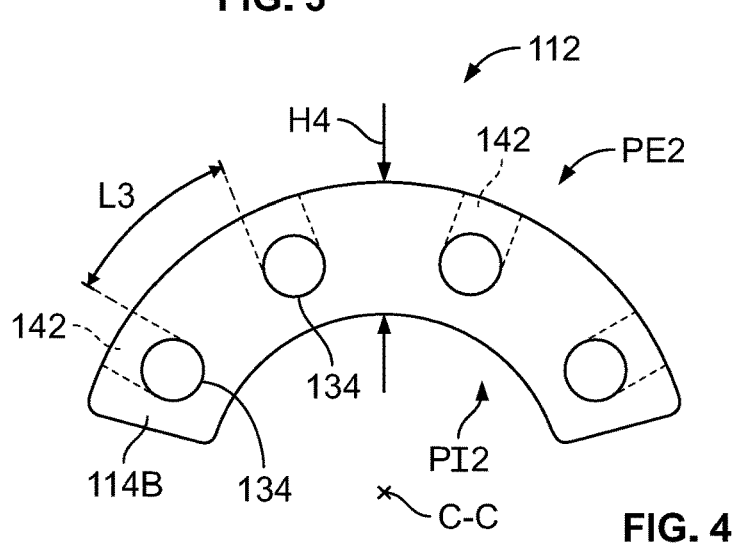
FIG. 4 is a right end view of the connector body of FIG. 2.

In some embodiments, the arcs of the profiles PE2 and PI2 are each smooth and continuous. In some embodiments, the arcs of the profiles PE2 and PI2 are substantially concentric about a central axis C-C (FIGS. 4, 9 and 10).

In some embodiments, the thickness or height 114 (FIG. 4) of the connector body 112 from the surface 120 to the surface 122 is in the range of from about 25 to 29 mm.

A plurality of neutral wire bores 130 are defined in the body 112. In the illustrated embodiment, four neutral wire bores 130 are provided; however, more or fewer neutral wire bores 130 may be provided in other embodiments.

Each neutral wire bore 130 extends axially through the body 112 from a first terminal opening 132 on the left end 114A to a second terminal opening 134 on the right end 114B. Integral gripping features (e.g., protrusions or ridges) may be provided in each neutral wire bore 130 to enhance engagement with a neutral wire.

Figure 3:
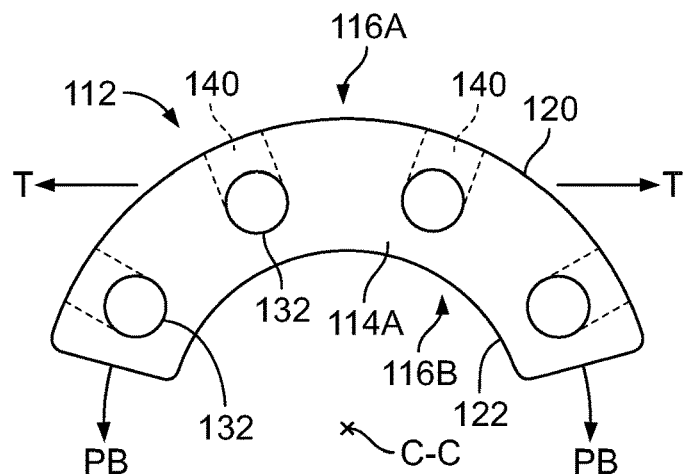
FIG. 3 is a left end view of the connector body of FIG. 2.

The bores 130 and the openings 132, 134 are serially and laterally or circumferentially distributed in a row across the width of the body 112. More particularly, the centers of the openings 132 define an arcuate profile PB on the end 114A (FIG. 3). Likewise, the centers of the openings 134 define an arcuate profile PB on the end 114B.

According to some embodiments, the arc measure or arc angle of the profile PB between the centers of the two endmost openings 132 is in the range of from about 90 to 180 degrees.

According to some embodiments, the spacing L3 (FIG. 4) between each adjacent opening 132, 134 is in the range of from about 7 to 20 mm.

According to some embodiments, each bore 130 has an inner diameter D5 (FIG. 2) in the range of from about 15 to 20 mm.

The connector body 112 further includes a plurality of first (left side) bolt bores 140 and a plurality of second (right side) bolt bores 142. Each bore 140, 142 includes a screw thread 149 (FIG. 9) on its inner diameter.

Each bore 140, 142 extends radially through the body 112 from a bore opening 143 (FIG. 10) at the outer surface 120 to a respective neutral wire bore 130. More particularly, each neutral wire bore 130 is intersected by one of the bolt bores 140 (adjacent the left end 114A) and by one of the bolt bores 142 (adjacent the right end 114B).

The bolt bores 140 extend serially and laterally or circumferentially in a row R1 across the outer side 116A. The bolt bores 142 likewise extend serially and laterally or circumferentially in a row R2 across the outer side 116A such that a circumferentially extending gap 144 is defined between the rows.

A retention feature in the form of a retention slot, channel or groove 124 is provided on the connector body 112. The retention groove 124 is inset from the outer surface 120. The retention groove 124 follows the arc or curvature of the outer surface 120. The retention groove 124 extends transversely across the full width of the body 112. The retention groove 124 extends between the row R1 of bolt bores 140 and the row R2 of bolt bores 142. In some embodiments, the retention groove 124 has a depth D6 (FIG. 10) that is greater than the thickness of the band 162. Additional or alternative retention features may be provided.

In some embodiments (e.g., as illustrated), the edges defined where the end faces (on ends 114A, 114B), the side faces (on lateral ends 118), the outer surface 120, and the inner surface 122 meet or intersect with one another are rounded I.e., not sharp). The rounding of these edges can prevent or inhibit the connector body 112 from damaging the cable 50 or the joint body 70.

The body 112 can be formed of any suitable material. According to some embodiments, the body 112 is formed of metal. In some embodiments, the body 112 is formed of aluminum. In some embodiments, the body 112 is monolithic.

Figure 5:
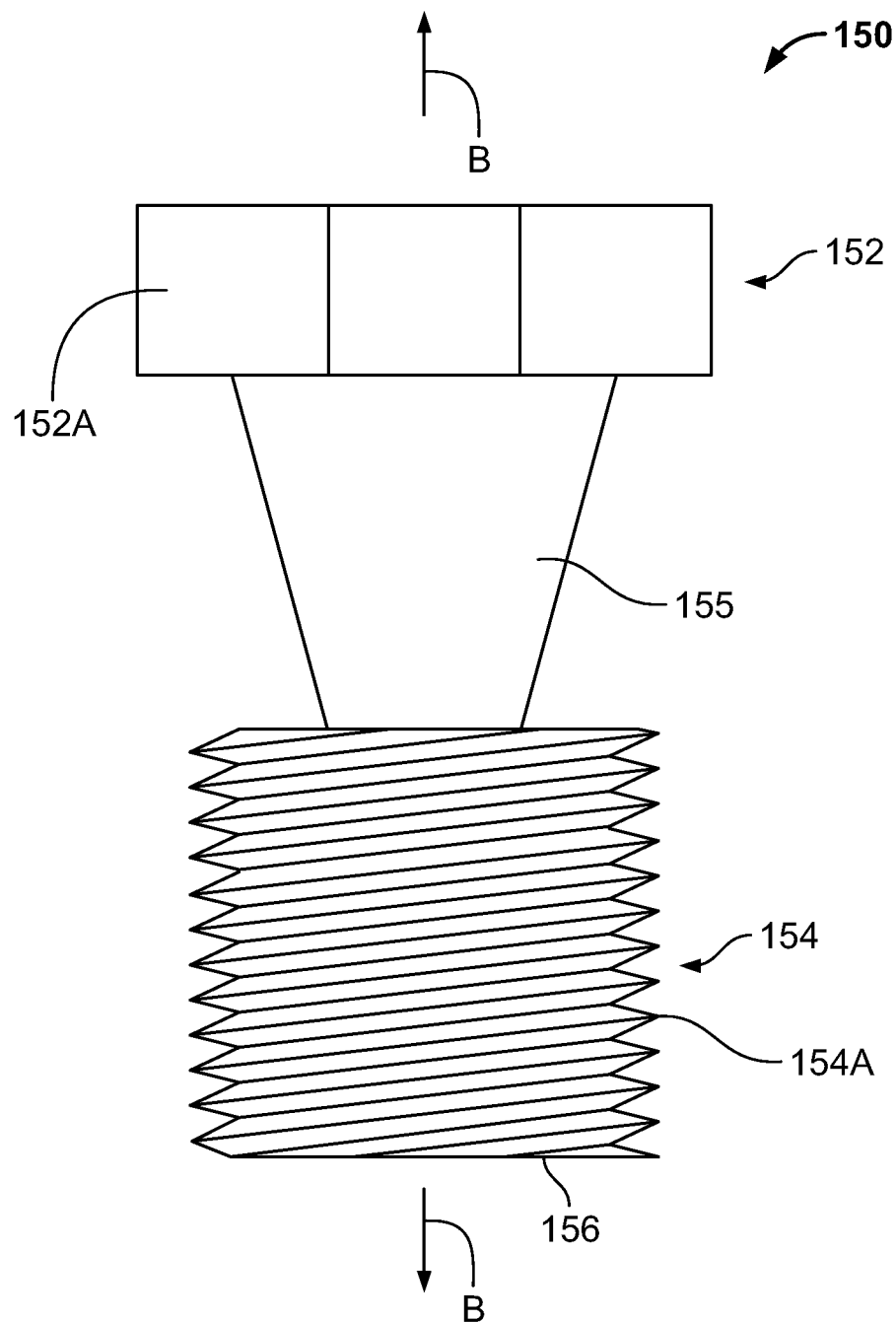
FIG. 5 is a side view of a shearbolt forming a part of the connector of FIG. 1.

The shear bolts 150 (FIGS. 1 and 5) may each be constructed and used in the same manner. Therefore, only one of the bolts 150 will be described in detail hereinbelow, it being understood that this discussion applies likewise to the other bolts 150.

The shear bolt 150 has a lengthwise axis B-B and opposed proximal and distal ends.

The bolt 150 is unitary and includes a head or drive section 152 at its proximal end, a shank 154 at its distal end, and a shearing or breakaway section 155 located between the drive section 152 and the shank 154. The shank 154 terminates an engagement surface 156.

The drive section 152 includes a driver engagement feature 152A, such as a faceted socket or head. The driver engagement feature 152A is configured to operably engage a driver so that the bolt 150 can be forcibly rotated about the axis B-B by the driver.

The outer diameter of the shank 154 includes a screw thread 154A.

In use, the threaded section 154A of the shank 154 is threadedly engaged with the bolt bore thread 149 of a respective one of the bores 140. The shank 154 extends through the bore 140 such that the engagement surface 156 is located proximate the neutral wire bore 130 and the driver engagement feature 152A is accessible from outside the connector body 112. In some embodiments and as shown, the drive section 152 projects radially outwardly beyond the outer surface 120.

The bolt 150 is adapted to be screwed down into its respective bolt bore 140 to clamp a conductor (neutral wire) in the underlying neutral wire bore 130. The drive section 152 on the bolt 150 is configured to shear off of the threaded shank 154 at the breakaway section 155 when subjected to a prescribed torque. When the bolt 150 breaks at the breakaway section 155, the drive section 152 is removed from the connector 100.

The bolt 150 may be formed of any suitable material. According to some embodiments, the bolt 150 is formed of a metal (e.g., copper or aluminum).

Shear bolts of other designs and constructions may be used in place of the shear bolts 150.

The retainer 160 is configurable to form an endless circumferential band having an adjustable inner diameter D8. According to some embodiments and as illustrated, the retainer 160 is a plastic (polymeric) cable tie (which may also be commonly referred to as a zip tie or tie wrap) including a flexible tape section or band 162 and an adjustment mechanism 164. The adjustment mechanism 164 may include a head 164A (which includes a pawl) and a series of slots or teeth 164B formed along the length of the band 162. In use, the free end of the band 162 is routed through the head 164A and pulled tight so that the pawl of the head 164A ratchets along and interlocks with the teeth 164B, thereby preventing the band 162 from backing out from the head and loosening the cable tie 160. An end of the band 162 can be initially non-engaged or disengaged from the adjustment head 164A so that the retainer 160 defines a sideward, radial or lateral opening (i.e., open looped). The end of the band 162 can then be inserted into or pre-installed in the adjustment head 164A to form an endless band or closed loop as shown in FIG. 1. The closed loop defines a through passage 160A. The band 162 is then pulled tight to adjust the length of loop formed by the band 162, and thereby the inner diameter D8 of the retainer 160.

The retainer 160 may be formed of any suitable material (s). In some embodiments, the band 162 is formed of a polymeric or plastic material, such as nylon. In some embodiments, the band 162 is formed of metal (e.g., steel).

Other types and configurations of retainers may be used in place of the retainer 160 in accordance with other embodiments. In accordance with some embodiments, the retainer 160 is a hose clamp including a worm gear or screw actuated adjustment mechanism. Other suitable retainers 160 may include spring hose clamps, rope, strap clamps, worm drive hose clamps, or snap hose clamps. In some embodiments, the retainer 160 is a wound self-adhesive tape.

Referring now to FIGS. 6-10, the connector 100 and the protected connection system 61 may be used to form a protected splice or connection assembly 20 (FIG. 8) between a pair of electrical power transmission cables 40 and 50 joined at a splice connection 22.

The cables 40, 50 are prepared as shown in FIGS. 6 and 7 such that a segment of each layer extends beyond the next overlying layer, except that one or more of the neutral wires 46 extends at least a prescribed distance beyond the end of the primary conductor 42.

The electrical splice connector 60 is secured to each primary conductor 42, 52 to mechanically and electrically couple the primary conductors 42, 52 to one another as shown in FIG. 6 to form the splice connection 22. The connector 60 may be any suitable type of connector such as a metal crimp connector. The splice 22 has a first (left) side 22L and an opposing second (right) side 22R.

The cover system 62 may then be installed over the splice connection 22 to form the protected connection assembly 20. The joint body 70 is installed around the connection assembly 20. The rejacket 66 is installed around the joint body 70. The components 70 and 66 may be installed in sequential steps or in a single step (e.g., from a shared holdout). Once installed, the joint body 70 fits snugly against the splice connector 60. In some embodiments, when installed, the joint body 70 is elastically expanded from its relaxed shape so that the joint body 70 applies a persistent radially compressive load against the splice connector 60.

The connector 100 is installed on the cable 50. More particularly, the connector member 110 is placed on the semiconductive layer 55 such that the inner surface 122 engages the semiconductive layer 55. The retainer 160 is looped around the connector member 110 and the cable 50 such that a segment of the band 162 is seated in and extends through the retention groove 124 and the gap 144. The diameter of the band 162 is reduced (using the adjustment mechanism 164) to secure the connector member 110 to the cable 50. In some embodiments, the adjustment mechanism 164 is used to tighten the band 162 such that the retainer 160 clamps the connector member 110 against the cable 50.

Because the cable 50 (in particular, the semiconductive layer 55) and the inner surface 122 are both cylindrical, the connector member 110 may generally conform to the shape of the cable 50 and present a relatively low profile over the cable 50. In some embodiments, the radius of curvature of the outer surface of the semiconductive layer 55 is within about five percent of the radius of curvature of the inner surface 122. In some embodiments, the central axis C-C of the curvatures of the profiles PE2, PI2 are substantially coaxial or coincident with the cable axis LC-LC.

The neutral wires 46 are divided into a plurality of discrete wire sets. In some embodiments, each wire set includes or consists of a neutral wire bundle 41 including a plurality of the neutral wires 46. Each neutral wire bundle 41 is routed axially over the splice connector 60 and the joint body 70 to the opposing side of the splice 22 as shown in FIG. 7.

Each neutral wire bundle 41 is then mechanically and electrically connected to the connector member 110. More particularly, each wire bundle 41 is inserted into a respective neutral wire bore 130 through its corresponding wire port 132 from the left side of the connector 100. Each bundle 41 is inserted into the neutral wire bore 130 until a section of the bundle 41 is positioned below the bolt 150 adjacent the selected wire port 132. Each bundle 41 is secured in its respective neutral wire bore 130 by the overlying bolt 150. Operation of one of the bolts 150 will be described below; however, it will be appreciated that this description may likewise apply to the other bundles 41 and bolts 150 (as well securement of the bundles 51 as discussed below).

The threads 154A of the shear bolt 150 are engaged with the threads 149 of the respective bolt bore 140. The shear bolt 150 is then screwed down through its bore 140 into contact with the wire bundle 41. The bolt 150 are further driven in (e.g., using a driver engaged with the drive feature 152A) until a prescribed torque is applied to the bolt 150. At the prescribed torque, the drive section 152 of the bolt 150 shears or breaks off from the shank 154 at the breakaway section 155. The wire bundle 41 is thereby compressively loaded by the bolt 150 and radially clamped between the engagement surface 156 of the bolt 150 and the opposing sidewall of the neutral wire bore 130. The drive section 152 is removed from the bolt 150 and may be discarded.

The neutral wires 56 are likewise divided into a plurality of discrete wire sets. In some embodiments, each wire set includes or consists of a neutral wire bundle 51 including a plurality of the neutral wires 56. Each neutral wire bundle 51 is routed axially to the near side of the splice 22 as shown in FIG. 8.

Each neutral wire bundle 51 is then mechanically and electrically connected to the connector member 110. More particularly, each wire bundle 51 is inserted into a respective neutral wire bore 130 through its corresponding wire port 134 from the right side of the connector 100. Each bundle 51 is inserted into the neutral wire bore 130 until a section of the bundle 51 is positioned below the bolt 150 adjacent the selected wire port 134. Each bundle 51 is secured in its respective neutral wire bore 130 by operating the overlying bolt 150 as described above for the bundles 41 and the bolts 150.

In some embodiments and as illustrated in the figures, each neutral wire handle 41 extends fully through its neutral wire bore 130 and the opposing wire port 134 so that a section of the bundle 41 extends beyond the opposing side 114B (i.e., the terminal end 41B of the wire bundle is located on the opposing side 114B). Likewise, in some embodiments and as illustrated, each neutral wire bundle 57 extends fully through its bore 130 and the opposing wire port 132 so that a section of the wire bundle 51 extends beyond the opposing side 114A (i.e., the terminal end of the wire bundle 51 is located on the opposing side 114A). In this case, the sections of the wire bundles 41, 51 in the bores 130 overlap in the wire bores 130 and are each clamped in place by both the shearbolt 150 in the bolt bore 140 and the shearbolt 150 in the bolt bore 142.

In other embodiments, some or all of the neutral wire bundles 41, 51 may terminate in their wire bore 130 so that they do not overlap and/or are only clamped by the shearbolt 150 proximate their wire port 132, 134 of entry into the wire bore 130.

In some embodiments, the supplemental or external ground cable 30 is also mechanically and electrically connected to the connector member 110. In this case, typically one of the wire ports 134 facing away from the splice 22 is not used to connect a cable neutral wire bundle 41, 51. The conductor 32 of the ground cable 30 is inserted into the corresponding neutral wire port 130 through this port 134 and secured by the adjacent bolt 150 as described above.

In some embodiments, the connector 100 is configured such that the bolts 150 break of at or below the outer surface 120 so that the portion 157 of each bolt 150 remaining after installation does not project radially outward beyond the surface 120 only a short distance or not at all. In some embodiments, the proximal end 157A of each remaining portion 157 is inset from the bolt bore opening 143 and the outer surface 120 (e.g., as shown in FIG. 9).

In the event that any of the ports 132, 134 are not used in the installation, the bolts 150 associated with those ports 132, 134 may be removed.

As will be appreciated from FIG. 9, in the installed connection assembly 103, the ports 132 are spatially distributed across the circumference or diameter of the cable 50 (i.e., laterally relative to the cable axis LC-LC). Likewise, in the installed connection assembly 103, the ports 134 are spatially distributed across the circumference or diameter of the cable 50 (i.e., laterally relative to the cable axis LC-LC). Additionally, the direction of exit (and insertion during assembly) for each neutral wire bundle 41, 51 is substantially parallel with the cable axis LC-LC.

The connector 100 can provide a number of advantages. The connector 100 can accommodate a relatively large number and cross-sectional size of cable neutral wires 46, 56 without requiring use of multiple connectors. The connector 100 can thus provide increase grounding wire capacity as compared to some known neutral wire connectors.

The connector 100 can nonetheless provide a relatively compact form factor in the protected connection assembly 20. Because of the cylindrical or rounded shape of the connector 100 and the distribution of the neutral wires 46, 56 at the connector 100, the radial height of the connection assembly 103 is reduced.

The connector 100 can provide improved ease of installation. A relatively large number and bulk of neutral wires 46, 56 can be divided into smaller wire bundles 41, 51. These smaller wire bundles 41, 51 may be easier to handle, including routing to the connector 100 and securing to the connector 100.

While the connector 100 includes four neutral wire ports 132, four neutral wire ports 134, and four neutral wire bores 130, neutral wire connectors according to other embodiments may include more or fewer of each. Also, in some embodiments the ports 132, 134 may not share neutral wire bores 130. For example, in some embodiments each port 130, 132 has a respective dead end bore. In some embodiments, the connector is configured such that the number of wire ports on one side is different than the number of wire ports on the opposing side.

The shear bolts 150 serve as conductor securing mechanisms that selectively secure the neutral wires in their respective ports 132, 134. However, in other embodiments, other conductor securing mechanisms may be used. Alternative conductor securing mechanisms may include non-shear bolt fasteners (e.g., set screws).

According to some embodiments, the concentric neutral cables 40, 50 are rated or used as electrical power transmission cables operated at an operating voltage of 69 kV or greater.

In some embodiments, the ports 132, 134 are the same size as one another. In some embodiments, one of the ports 134 is larger than the others to receive a larger diameter ground wire conductor 32.

Figure 11:
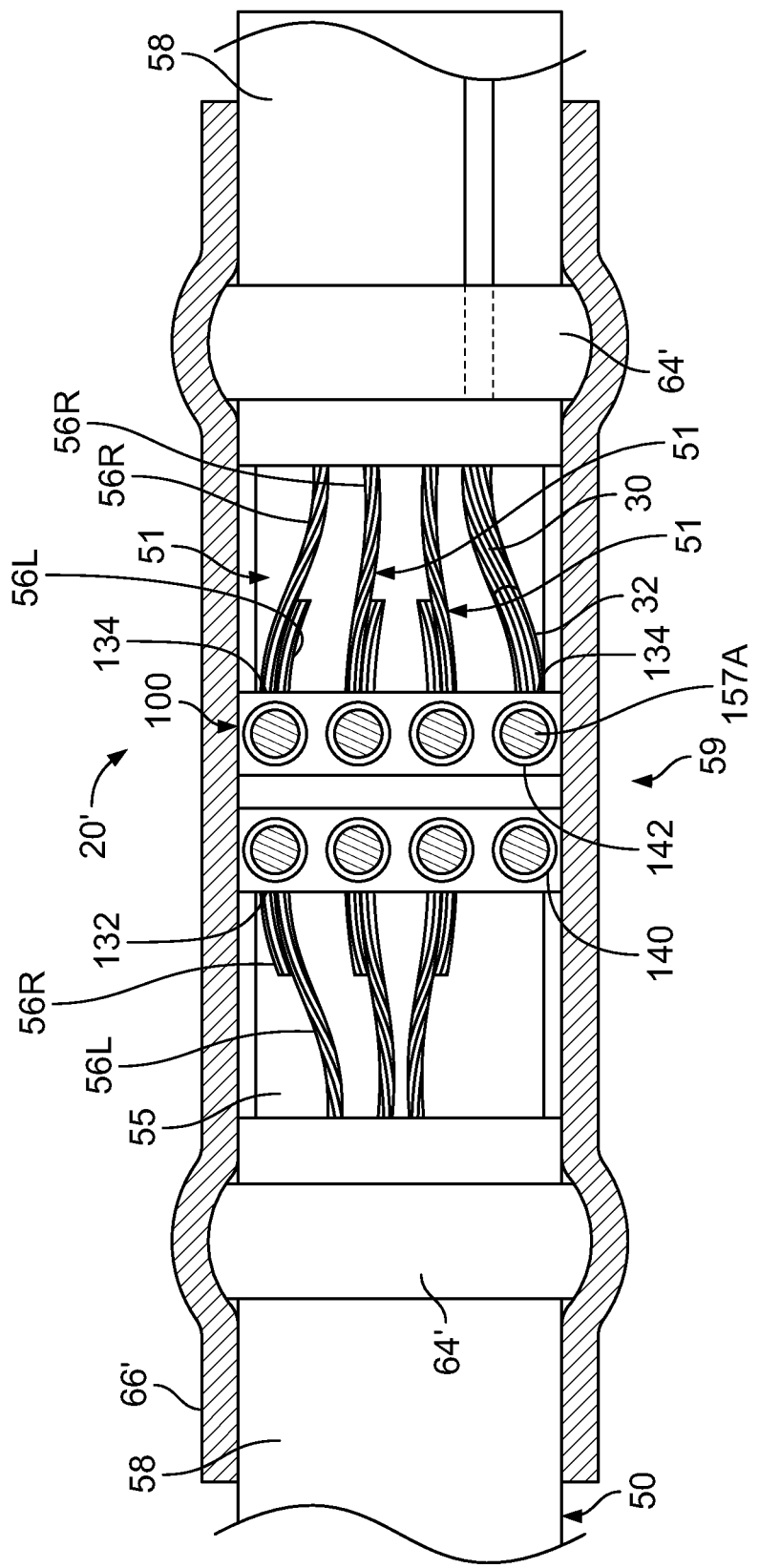
FIG. 11 is a fragmentary, side view of an alternative connection assembly including the connector of FIG. 1.

FIG. 11 shows an alternative connection assembly 20' including the connector 100. In this case, the connector 100 is used to form a cable mid-span electrical grounding connection between the neutral wires 56 of a concentric neutral cable 50 (which may be constructed as described above for the cable 50) and a ground cable 30.

To install the connection assembly 20', a section of the jacket 58 is removed to form a cable exposed section 59. The neutral wires 56 are severed at the section 59 to form a left side set of neutral wires 56L and an opposing right side set of neutral wires 56R from the formerly continuous neutral wires 56. The neutral wires 56L, 56R on either side are formed into respective neutral wire bundles 51 and inserted and secured in respective ports 132, 134 of the connector 100 using the shear bolts 150 as described above. The conductor 32 of the ground cable conductor 30 is also secured in one of the ports 134 using a shear bolt 150 as described above.

The connector body 110 is secured to the cable 50 at the section 59 on the semiconductive layer 55 as described above. A rejacket sleeve 66' corresponding to the rejacket sleeve 66 may be installed over the section 59 and the cable jacket 58 on either side of the section 59. The ends of the rejacket 66' may be sealed with mastic 64', for example.

In some embodiments, the connector body 110 includes at least two neutral wire ports 132 on the side 114A and at least two neutral wire ports 134 on the side 114B. In some embodiments, the connector body 110 includes at least three neutral wire ports 132, 134 on at least one side 114A, 114B.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for forming a connection with a first cable, the first cable having neutral wires and a cable longitudinal axis, the method comprising:
    providing a cable neutral wires connector including:
        a connector body having a first axial end and an opposing second axial end;
        a first set of neutral wire ports defined in the first axial end;
        a second set of neutral wire ports defined in the second axial end; and
        at least one securing mechanism;
    inserting the neutral wires of the first cable through a plurality of the neutral wire ports of the first set;
    securing the inserted neutral wires of the first cable in the connector body using the at least one securing mechanism;
    inserting neutral wires of a second cable through a plurality of the neutral wire ports of the second set;
    securing the neutral wires of the second cable in the connector body using the at least one securing mechanism, whereby the neutral wires of the first cable are electrically connected to the neutral wires of the second cable; and
    mounting the connector body on the first cable, wherein the neutral wire ports of the first set are circumferentially distributed about the first cable longitudinal axis when the connector body is mounted on the first cable.

2. The method of claim 1 wherein:
    the connector body includes an inner surface configured to face toward the first cable when the cable neutral wires connector is mounted on the first cable;
    the inner surface is concave and is substantially partial cylindrical in shape; and
    mounting the connector body on the first cable includes mounting the connector body on the first cable such that the inner surface of the connector body engages a semiconductive layer of the first cable.

3. The method of claim 1 wherein:
    the connector body includes a plurality of neutral wire bores defined therein; and
    each neutral wire bore communicates with a respective one of the neutral wire ports of the first set and receives the neutral wire(s) of the first cable inserted through the respective neutral wire port of the first set.

4. The method of claim 3 wherein each neutral wire bore also communicates with a respective one of the neutral wire ports of the second set, and receives the neutral wire(s) of the second cable inserted through the respective neutral wire port of the second set.

5. The method of claim 3 wherein:
    the at least one securing mechanism includes a plurality of shear bolts; and
    the method includes securing the neutral wires of the first cable in the neutral wire bores using the shear bolts.

6. The method of claim 5 wherein:
    the connector body includes an outer surface configured to face away from the first cable when the cable neutral wires connector is mounted on the first cable;
    the connector body includes a plurality of bolt bores each extending through the outer surface and intersecting a respective one of the neutral wire bores; and
    securing the neutral wires of the first cable in the neutral wire bores using the shear bolts includes breaking off the shear bolts at or below the outer surface.

7. The method of claim 1 wherein:
    the connector body includes an outer surface that is convex and substantially partial cylindrical in shape; and
    mounting the connector body on the first cable includes mounting the connector body on the first cable such that the outer surface faces away from the first cable.

8. The method of claim 1 wherein:
    the connector body includes an inner surface that is concave and is substantially partial cylindrical in shape; and
    mounting the connector body on the first cable includes mounting the connector body on the first cable such that the inner surface faces toward the first cable.

9. The method of claim 8 wherein:
    the connector body includes an outer surface that is convex and is substantially partial cylindrical in shape;
    the connector body has a substantially arcuate shape in lateral cross-section; and
    mounting the connector body on the first cable includes mounting the connector body on the first cable such that the outer surface faces away from the first cable.

10. The method of claim 1 including securing the connector body to the first cable using a retainer.

11. The method of claim 10 wherein:
    the retainer includes a band; and
    securing the connector body to the first cable using the retainer includes encircling the first cable with the band.

12. The method of claim 10 including operating an adjustment mechanism of the retainer to tighten the cable neutral wires connector onto the first cable.

13. The method of claim 10 wherein the connector body includes at least one retention feature that cooperates with the retainer to position the connector body on the first cable.

14. The method of claim 1 wherein the neutral wire ports of the first set define an arcuate profile about the cable longitudinal axis.

15. The method of claim 1 wherein the plurality of neutral wire ports of the first set includes at least three neutral wire ports.

16. The method of claim 1 wherein the at least one securing mechanism includes at least one shear bolt configured to secure the neutral wires of the first cable in the connector body.

17. The method of claim 1 wherein the connector body is formed of metal.

18. The method of claim 17 wherein the connector body is monolithic.

19. A cable connection assembly comprising:
a first cable having neutral wires and a cable longitudinal axis;
a second cable having neutral wires;
a cable neutral wires connector including:
   a connector body mounted on the first cable, the connector body having a first axial end and an opposing second axial end;
   a first set of neutral wire ports defined in the first axial end;
   a second set of neutral wire ports defined in the second axial end; and
   at least one securing mechanism;
wherein:
   the neutral wires of the first cable are inserted through a plurality of the neutral wire ports of the first set;
   the inserted neutral wires of the first cable are secured in the connector body using the at least one securing mechanism;
   the neutral wire ports of the first set are circumferentially distributed about the cable longitudinal axis;
   the neutral wires of the second cable are inserted through a plurality of the neutral wire ports of the second set; and
   the neutral wires of the second cable are secured in the connector body by the at least one securing mechanism;
   whereby the neutral wires of the first cable are electrically connected to the neutral wires of the second cable.

20. The cable connection assembly of claim 19 wherein:
the connector body includes an inner surface configured to face toward the first cable when the cable neutral wires connector is mounted on the first cable;
the inner surface is concave and is substantially partial cylindrical in shape; and
the connector body is mounted on the first cable such that the inner surface of the connector body engages a semiconductive layer of the first cable.

21. The cable connection assembly of claim 19 wherein:
the connector body includes a plurality of neutral wire bores defined therein; and
each neutral wire bore communicates with a respective one of the neutral wire ports of the first set and receives the neutral wire(s) of the first cable inserted through the respective neutral wire port of the first set; and
each neutral wire bore also communicates with a respective one of the neutral wire ports of the second set, and receives the neutral wire(s) of the second cable inserted through the respective neutral wire port of the second set.

22. The cable connection assembly of claim 21 wherein:
the at least one securing mechanism includes a plurality of shear bolts;
the neutral wires of the first cable are secured in the neutral wire bores by the shear bolts;
the connector body includes an outer surface configured to face away from the first cable when the cable neutral wires connector is mounted on the first cable;
the connector body includes a plurality of bolt bores each extending through the outer surface and intersecting a respective one of the neutral wire bores; and
the shear bolts are broken off at or below the outer surface.

23. The cable connection assembly of claim 19 wherein:
the connector body is secured to the first cable by a retainer; and
the retainer includes a band encircling the first cable.

24. The cable connection assembly of claim 19 wherein the at least one securing mechanism includes at least one shear bolt securing the neutral wires of the first cable in the connector body.

* * * * *